(12) United States Patent
Chakrabarti et al.

(10) Patent No.: US 7,518,279 B2
(45) Date of Patent: Apr. 14, 2009

(54) ELECTRIC MOTOR SYSTEMS

(75) Inventors: Sibaprasad Chakrabarti, Torrance, CA (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/829,275

(22) Filed: Jul. 27, 2007

(65) Prior Publication Data

US 2009/0026895 A1     Jan. 29, 2009

(51) Int. Cl.
*H02K 19/26* (2006.01)
(52) U.S. Cl. ..................................... 310/180
(58) Field of Classification Search .................. 310/180, 310/187, 179, 184–185, 198–201
See application file for complete search history.

(56) References Cited

U.S. PATENT DOCUMENTS

| | | | |
|---|---|---|---|
| 6,833,648 B2 * | 12/2004 | Gorohata et al. | 310/180 |
| 6,841,913 B2 * | 1/2005 | Gorohata et al. | 310/180 |
| 6,888,330 B2 * | 5/2005 | Arimitsu | 318/433 |
| 2006/0022679 A1 * | 2/2006 | Obata et al. | 324/551 |

* cited by examiner

*Primary Examiner*—Jean F Duverne

(57) ABSTRACT

Electric motor systems are provided for use in vehicles. In an embodiment, by way of example only, the system includes a first inverter, a second inverter, and a motor electrically coupled to the first and the second inverters. The motor includes a stator including a plurality of slots formed therein and a plurality of windings. The plurality of windings is disposed at least partially in the slots, and each winding includes a first coil and a second coil. The first coil has a first number of turns, and the second coil has a second number of turns that is unequal to the first number of turns. The first coil of each winding is electrically coupled to the first inverter, and the second coil of each winding is electrically coupled to the second inverter.

14 Claims, 4 Drawing Sheets

ELECTRIC MOTOR SYSTEMS

TECHNICAL FIELD

The inventive subject matter generally relates to electric motor systems, and more particularly relates to electric motor systems for use in a vehicle.

BACKGROUND OF THE INVENTIVE SUBJECT MATTER

In a DC-driven electric motor system that includes a single motor and two voltage sources, such as in a traction drive unit, the power of the system is typically increased by enlarging the motor, adding additional magnets to the motor, or boosting the available DC voltage with, for example, a conventional boost DC-DC converter. However, a larger motor requires additional space, additional magnets provide additional complexity, and boosting the available DC voltage burdens the motor with a higher current rating Accordingly, it is desirable to provide an improved electric motor system topology capable of obtaining additional power output from a single motor system without adding complexity to the system or increasing the motor size. Furthermore, other desirable features and characteristics of the inventive subject matter will become apparent from the subsequent detailed description and the appended claims, taken in conjunction with the accompanying drawings and the foregoing technical field and background.

SUMMARY OF THE INVENTIVE SUBJECT MATTER

Electric motor systems are provided for use in vehicles. In an embodiment, by way of example only, the system includes a first inverter, a second inverter, and a motor electrically coupled to the first and the second inverters. The motor includes a stator including a plurality of slots formed therein and a plurality of windings. The plurality of windings is disposed at least partially in the slots and includes a first coil and a second coil. The first coil has a first number of turns, and the second coil has a second number of turns that is unequal to the first number of turns. The first coil of each winding is electrically coupled to the first inverter, and the second coil of each winding is electrically coupled to the second inverter.

DESCRIPTION OF THE DRAWINGS

The inventive subject matter will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the inventive subject matter or the application and uses of the inventive subject matter. Furthermore, there is no intention to be bound by any expressed or implied theory presented in the preceding technical field, background, brief summary or the following detailed description.

Figure 1:
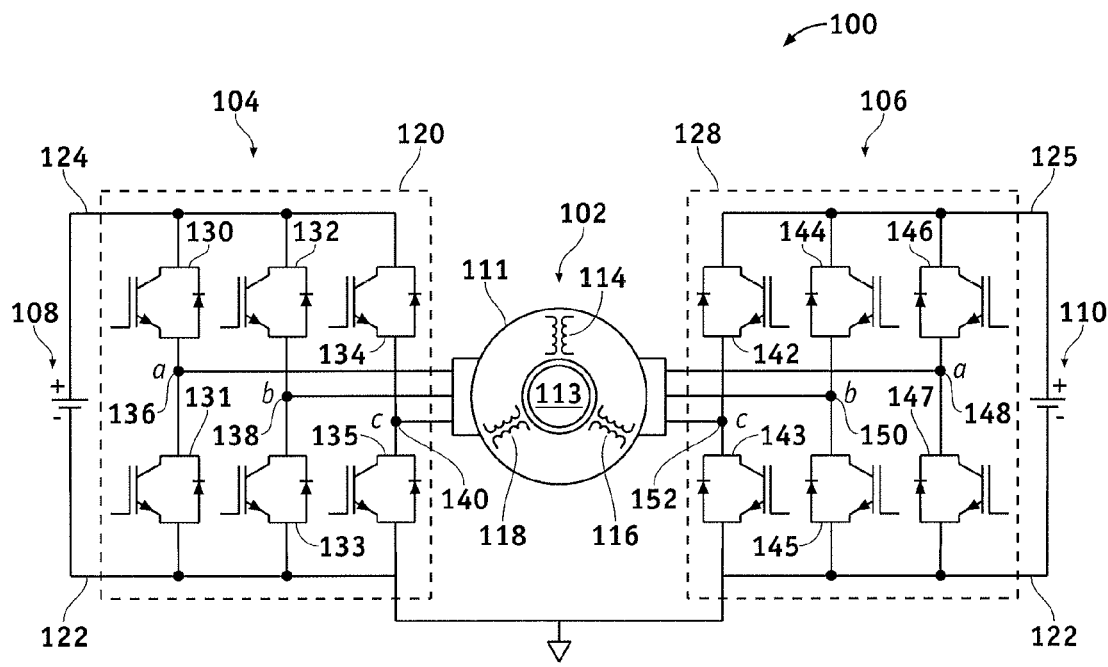
FIG. 1 is a schematic diagram of an electric motor system for use in a vehicle, according to an embodiment.

FIG. 1 depicts an electric motor system 100 for use in a vehicle. The electric motor system 100 may be implemented in any electric or hybrid-electric vehicle. In this regard, the electric motor system 100 includes at least a motor 102, two inverters 104, 106, and two voltage sources 108, 110.

Figure 2:
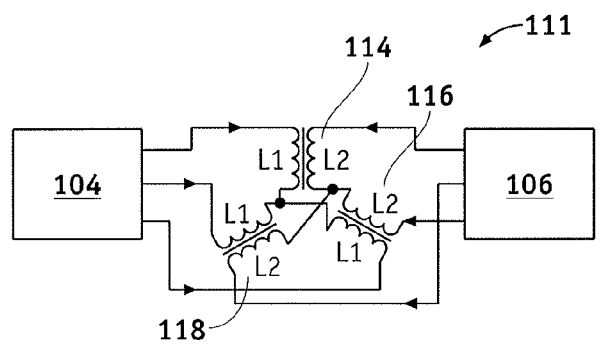
FIG. 2 is a more detailed schematic of the electric motor system of FIG. 1 including a stator assembly.

In an embodiment, the motor 102 is a three-phase motor and includes a stator assembly 111 and a rotor assembly 113. The stator assembly 111 includes three conductive windings 114, 116, 118. Turning to FIG. 2, a more detailed schematic of the system 100 including the stator assembly is shown. Each winding 114, 116, 118 has two legs L1 and L2. One leg L1 of each winding 114, 116, 118 is electrically coupled to the first inverter 104, while the other leg L2 of each winding 114, 116, 118, is electrically coupled to the second inverter 106.

With reference back to FIG. 1, the rotor assembly 113 may be a conventional rotor (e.g., a PM rotor or an induction machine rotor) for use in a motor 102 and may have, for example, a stator core. In an embodiment, the motor 102 may additionally include a cooling fluid (i.e., coolant) (not shown) that circulates therethrough.

In the embodiment shown in FIG. 1, each inverter 104, 106 may be a three-leg inverter connected to the motor 102 across the DC link by switching elements of the inverters 104, 106. The inverters 104, 106 may each include a first set of switching elements 120 connected between a high voltage side 124, 125 and a low voltage side 122 of one of the voltage sources 108 and a second set of switching elements 128 also connected between the high voltage side 124, 125 and the low voltage side 122 of the other source 110. The switching elements are preferably transistors, such as insulated gate bipolar transistors (IGBTs) or Metal-Oxide-Semiconductor Field-Effect Transistors (MOSFETs). In an embodiment, protective capacitors (not shown) may be connected between the high voltage side 124 and the low voltage side 122 of the voltage sources 108, 110.

Transistors 130, 132, 134 of the first set of switching elements 120 are connected between the high voltage side 124, 125 and corresponding ones of a first set of nodes 136, 138, 140, each of the nodes 136, 138, 140 connected to a first winding end of one of the plurality of windings 114, 116, 118 of the motor 102. Transistors 131, 133, 135 of the first set of switching elements 120 are connected between the low voltage side 122 and corresponding ones of the first set of nodes 136, 138, 140.

In accordance with the embodiment, transistors 142, 144, 146 of the second set of switching elements 128 are connected between the high voltage side 124, 125 and corresponding ones of a second set of nodes 148, 150, 152, each of the nodes 148, 150, 152 connected to a second winding end of one of the plurality of windings 114, 116, 118 of the motor 102. Transistors 143, 145, 147 are connected between the low voltage side 122 and corresponding ones of the second set of nodes 148, 150, 152.

As alluded to above, the voltage sources 108, 110 are electrically coupled to a corresponding inverter 104, 106, respectively, and to the motor 102, and each is configured to deliver DC current to the corresponding inverter 104, 106. In an embodiment, one voltage source ("first voltage source") 108 may be a fuel cell and the other voltage source ("second voltage source") 110 may be a battery. In such case, the fuel cell or first voltage source 108 may feed power or discharge power to the motor 102 and to the battery or second voltage source 110, while the second voltage source 110 may discharge power to the motor 102 and may be fed power from or charged by the first voltage source 108. Because the first voltage source 108 can discharge power and the second voltage source 110 can both discharge power and be charged, the current rating of the windings 114, 116, 118 electrically coupling their corresponding inverters 104, 106 to the motor 102 may be configured such that each has a different maximum current carrying capability. Consequently, the current ratings of the windings 114, 116, 118 may be unequal, in an embodiment.

In order to optimize power distribution and usage in the electric motor system 100 using unequally rated windings 114, 116, 118, each winding 114, 116, 118 is split into two coils, in an embodiment where each coil end is a leg, either L1 or L2, each coil is configured to be electrically isolated from each other, and each coil has a different current rating. As briefly mentioned above, the inverters 104, 106 are electrically coupled to the motor 102 such that one leg L1 of each winding 114, 116, 118 is electrically coupled to the first inverter 104, while the other leg L2 of each winding 114, 116, 118, is electrically coupled to the second inverter 106.

Figure 3:
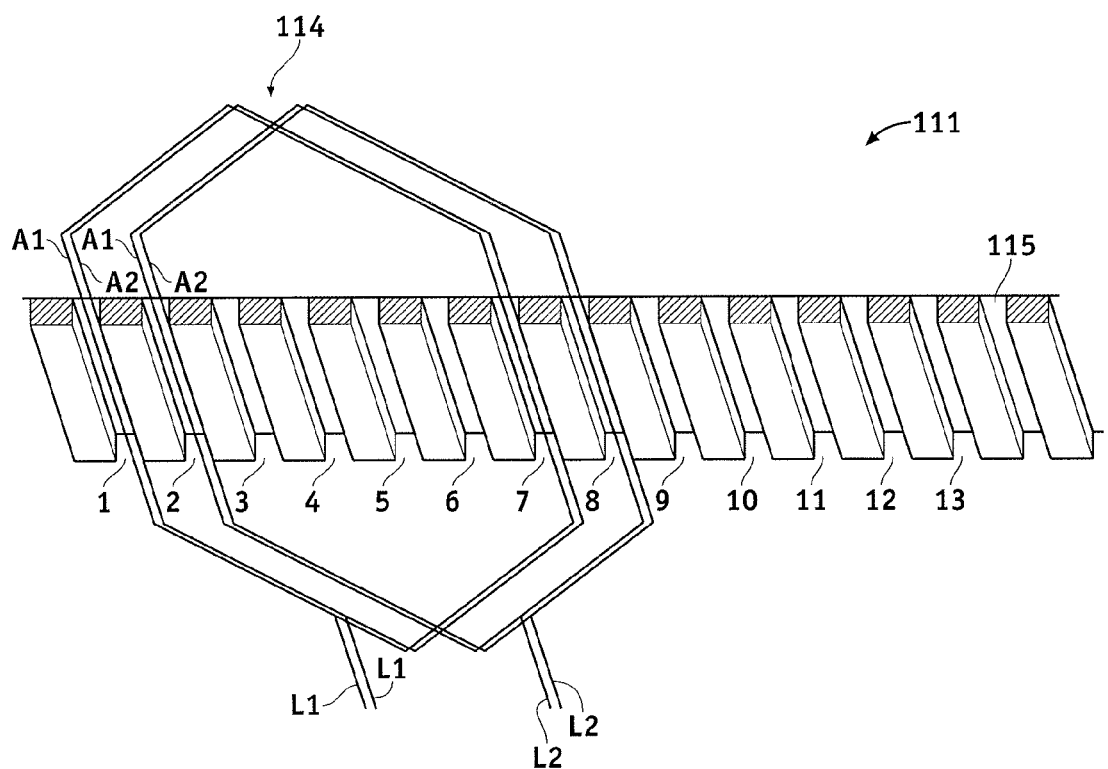
FIG. 3 is a planar view of a stator assembly of a motor, according to an embodiment.
Figure 4:
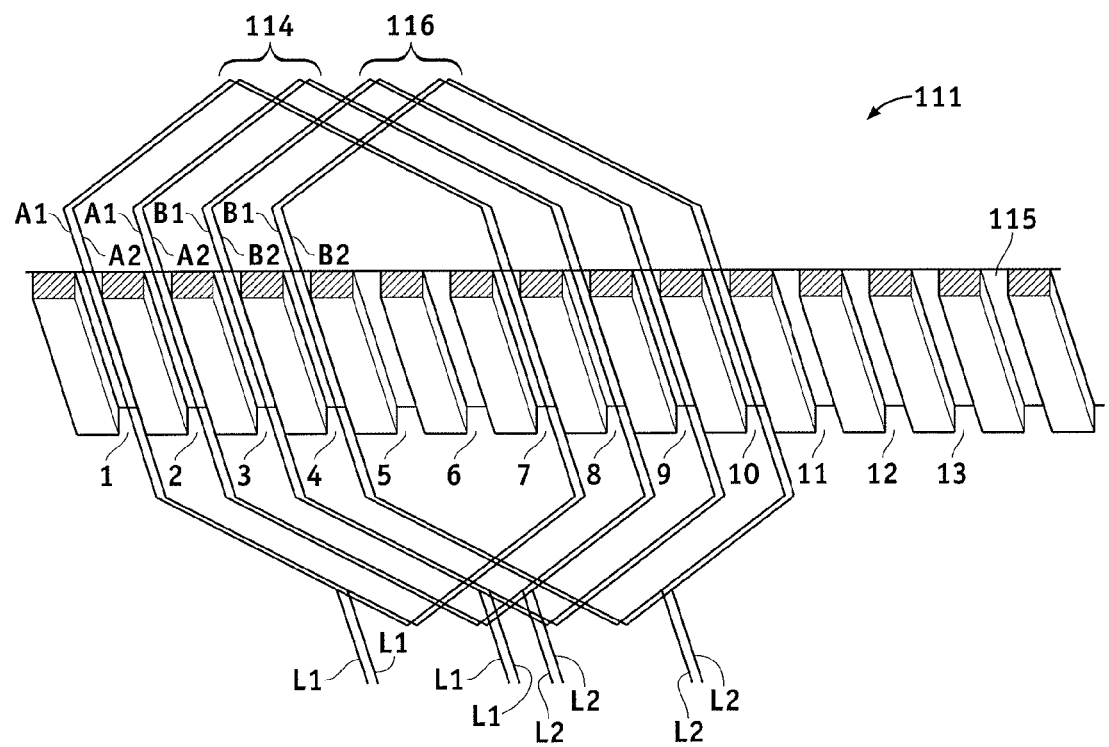
FIG. 4 is a planar view of the stator assembly of the motor, according to another embodiment of FIG. 3.
Figure 5:
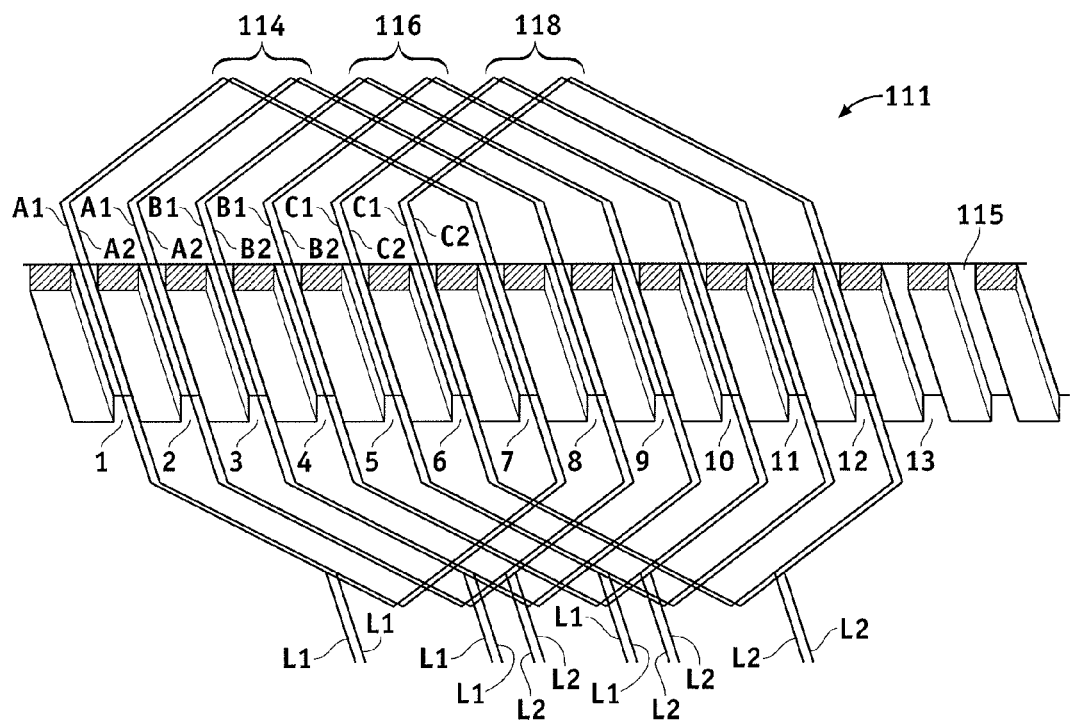
FIG. 5 is a planar view of the stator assembly of the motor of FIG. 3, according to another embodiment.

With additional reference to FIGS. 3-5, planar views of the stator assembly 111 of the motor 102 is provided, according to various embodiments. It will be appreciated that the planar view is provided for ease of explanation to show how the unequally rated windings 114, 116, 118 may be disposed in the stator assembly 111 and that the stator assembly 111 may be formed as a cylinder. In any event, the stator assembly 111 includes a stator 115, a plurality of slots 1-12, and windings 114, 116, 118. Although thirteen slots are shown in the stator 115, it will be appreciated that a different number of slots may alternatively be included. The windings 114, 116, 118 are at least partially disposed in the slots 1-12 and are made up of two coils each. Winding 114 includes coil A1 and coil A2, winding 116 includes coil B1 and coil B2, and winding 118 includes coil C1 and coil C2. It will be appreciated that each coil may make one or more turns between the slots.

In an embodiment, the windings 114, 116, 118 may be disposed in the stator assembly 111 such that no phase difference exists between two coils of the same winding. For example, as shown in FIG. 3, coil A1 of winding 114 has a leg L1 that is connected to the first inverter 104 and makes several turns in a first pair of non-adjacent slots (e.g., slots 1 and 7). After making turns in the first pair of non-adjacent slots (e.g., slots 1 and 7), coil A1 then makes turns in a second pair of non-adjacent slots, where a second slot (e.g., slot 2) is adjacent a first slot (e.g., slot 1) of the first pair of non-adjacent slots and a second slot (e.g., slot 8) is adjacent a second slot (e.g., slot 7) of the first pair of non-adjacent slots. Leg L2 of winding 114 is then connected to the second inverter 106.

Coil A2 may be disposed over coil A1. It will be appreciated that spatial terms or phrases, such as over, under, or on top of, are used simply to provide a spatial relationship between two components and that the components are not limited to such relationships. Thus, coil A2 similarly has a leg L1 that is connected to the first inverter 104 and makes several turns in the first pair of non-adjacent slots (e.g., slots 1 and 7). After making turns in the first pair of non-adjacent slots (e.g., slots 1 and 7), coil A2 then makes turns in the second pair of non-adjacent slots (e.g., slots 2 and 8). Leg L2 of coil A2 is then connected to the second inverter 106.

Turning to FIG. 4, a planar view of the stator assembly 111 of the motor 102 is provided, according to another embodiment. The stator assembly 111 includes both windings 114 and 116. As shown in FIG. 4, coil B1 of winding 116 makes turns in a third pair of non-adjacent slots (e.g., slots 3 and 9) that are located such that the second pair of non-adjacent slots are between the first and the third pairs of non-adjacent slots. After making turns in the third pair of non-adjacent slots, coil B1 makes turns in a fourth pair of non-adjacent slots (e.g., slots 4 and 10) that are located such that the third pair of non-adjacent slots are between the second and fourth pairs of non-adjacent slots. Leg L1 of coils B1 is connected to the first inverter 104 and leg L2 of coil B1 is connected to the second inverter 106. Coil B2 is disposed over coil B1. Thus, coil B2 similarly has a leg L1 that is connected to the first inverter 104 and makes several turns in the third pair of non-adjacent slots (e.g., slots 3 and 9). After making turns in the third pair of non-adjacent slots (e.g., slots 3 and 9), coil B2 then makes turns in the fourth pair of non-adjacent slots (e.g., slots 4 and 10). Leg L2 of coil B2 is then connected to the second inverter 106.

FIG. 5 is another planar view of the stator assembly 111 of the motor 102 is provided, according to an embodiment. Here, windings 114, 116, 118 are shown. Coil C1 of winding 118 makes turns in a fifth pair of non-adjacent slots (e.g., slots 5 and 11) that are located such that the fourth pair of non-adjacent slots are between the third and the fifth pairs of non-adjacent slots. After making turns in the fifth pair of non-adjacent slots, coil C1 makes turns in a sixth pair of non-adjacent slots (e.g., slots 6 and 12) that are located such that the fourth pair of non-adjacent slots are between the third and sixth pairs of non-adjacent slots. Leg L1 of coil C1 is connected to the first inverter 104 and leg L2 of coils C1 is connected to the second inverter 106. Coil C2 is disposed over coil C1. Thus, coil C2 has a leg L1 that is connected to the first inverter 104 and makes several turns in the fifth pair of non-adjacent slots (e.g., slots 5 and 11). After making turns in the fifth pair of non-adjacent slots (e.g., slots 5 and 11), coil C2 then makes turns in the sixth pair of non-adjacent slots (e.g., slots 6 and 12). Leg L2 of coil C2 is then connected to the second inverter 106.

Figure 6:
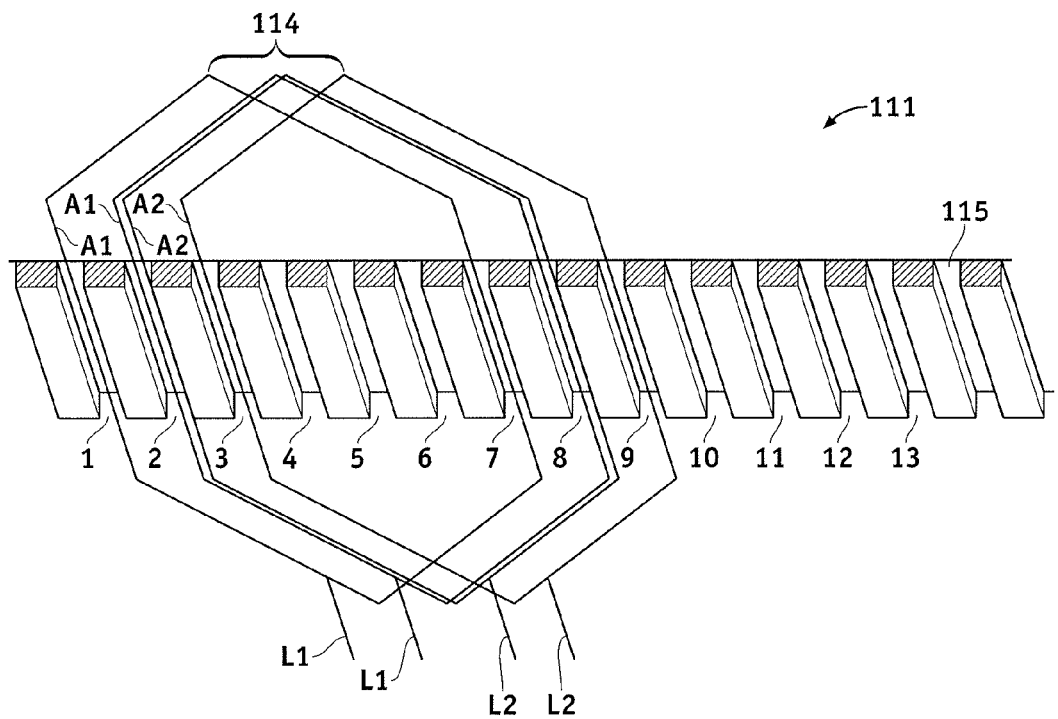
FIG. 6 is planar view of the stator assembly of the motor of FIG. 3, according to another embodiment.
Figure 7:
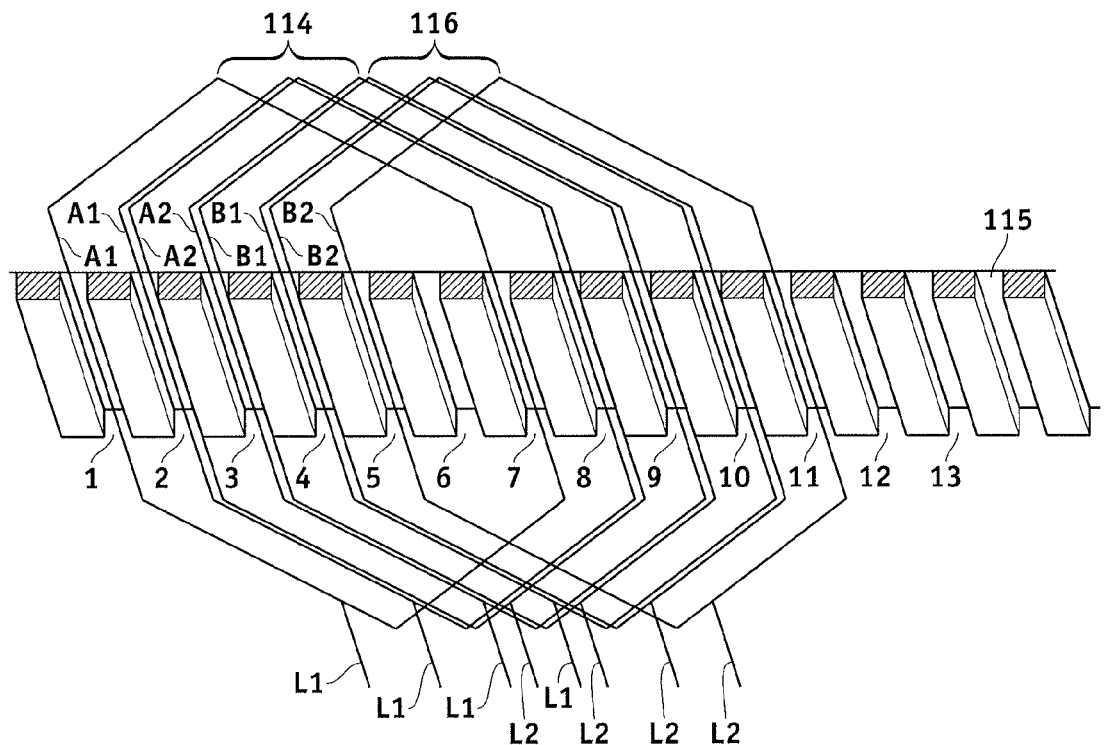
FIG. 7 is a planar view of the stator assembly of the motor of FIG. 3, according to another embodiment.
Figure 8:
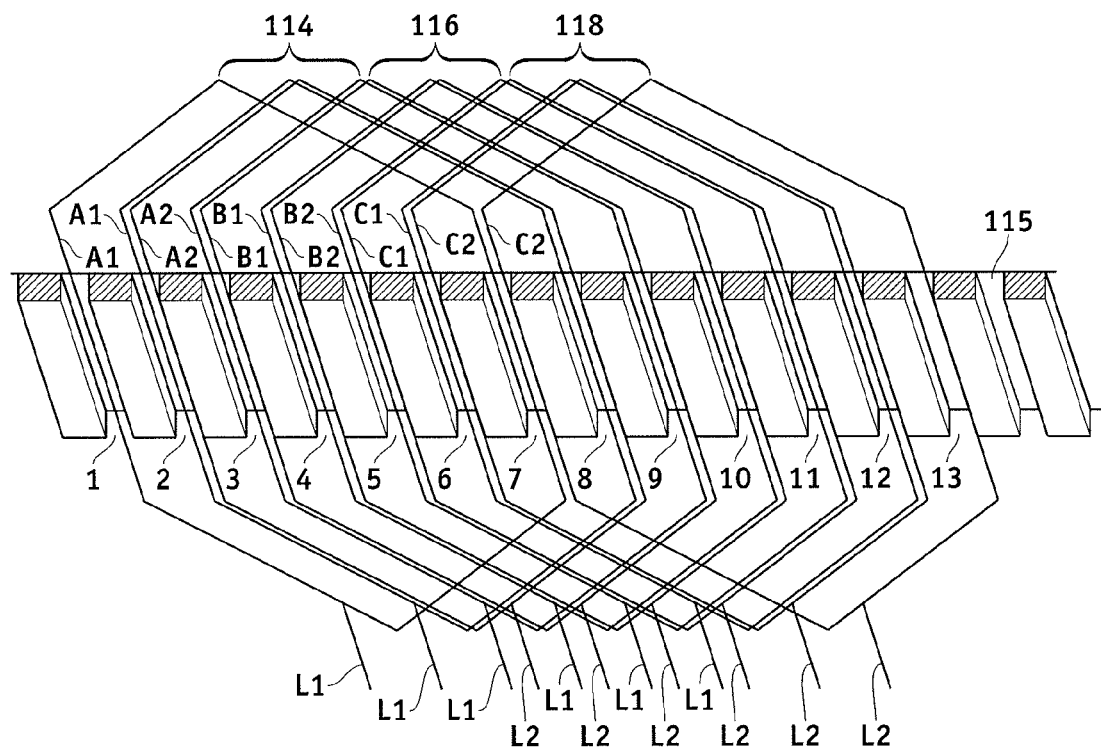
FIG. 8 is a planar view of the stator assembly of the motor of FIG. 3, according to another embodiment.

In other embodiments shown in FIGS. 6-8, the windings 114, 116, 118 may be disposed in the stator assembly 111 where a phase difference equivalent to one slot exists between two coils of the same winding. FIG. 6 is a planar view of the stator assembly of the motor, according to still another embodiment. In this embodiment, the stator assembly 111 includes a plurality of slots 1-13 and windings 114 is shown herein. Coil A1 of winding 114 has a leg L1 that is connected to the first inverter 104 and makes several turns in a first pair of non-adjacent slots (e.g., slots 1 and 7). After making turns in the first pair of non-adjacent slots (e.g., slots 1 and 7), coil A1 makes turns in the second pair of non-adjacent slots (e.g., slots 2 and 8), where a first slot (e.g., slot 2) is adjacent a first slot (e.g., slot 1) of the first pair of non-adjacent slots and a second slot (e.g., slot 8) is adjacent a second slot (e.g., slot 7) of the first pair of non-adjacent slots. Leg L2 of coil A1 is then connected to the second inverter 106. Coil A2 of winding 114 makes turns in the second pair of non-adjacent slots (e.g., slots 2 and 8), and has a leg L1 that is connected to the first inverter 104. Coil A2 then makes turns in the third pair of non-adjacent slots (e.g., slots 3 and 9), where the third pair of non-adjacent slots is located such that the second pair of non-adjacent slots are between the first and the third pairs of non-adjacent slots. Leg L2 of coil A2 is connected to the second inverter 106.

FIG. 7 is a planar view of the stator assembly of the motor, according to still another embodiment. Here, windings 114 and 116 are shown. Leg L1 of coil B1 is connected to the first inverter 104 and makes turns in the third pair of non-adjacent slots (e.g., slots 3 and 9). Coil B1 then continues on to make turns in a fourth pair of non-adjacent slots (e.g., slots 4 and 10) that are located such that the third pair of non-adjacent slots are between the second and fourth pairs of non-adjacent slots. Leg of coil B1 is connected to the second inverter 106. Coil B2 of winding 116 makes turns in the fourth pair of non-adjacent slots, and has a leg L1 that is connected to the first inverter 104. Coil B2 then makes turns in a fifth pair of non-adjacent slots (e.g., slots 5 and 11), where the fifth pair of non-adjacent slots are located such that the fourth pair of non-adjacent slots are between the third and the fifth pairs of non-adjacent slots. Leg L2 of coil B2 is connected to the second inverter 106.

FIG. 8 is a planar view of the stator assembly of the motor, according to still yet another embodiment. Here, windings 114, 116, 118 are shown. Leg L1 of coil C1 of winding 118 is connected to the first inverter 104 and makes turns in the fifth pair of non-adjacent slots (e.g., slots 5 and 11). Coil C1 then continues on to make turns in a sixth pair of non-adjacent slots (e.g., slots 6 and 12) that are located such that the fifth pair of non-adjacent slots are between the fourth and sixth pairs of non-adjacent slots. Leg of coil C1 is connected to the second inverter 106. Coil C2 of winding 118 makes turns in the sixth pair of non-adjacent slots (e.g., slots 5 and 11), and has a leg L1 that is connected to the first inverter 104. Coil C2 then makes turns in a seventh pair of non-adjacent slots (e.g., slots 6 and 12), where the seventh pair of non-adjacent slots are located such that the sixth pair of non-adjacent slots are between the fifth and the seventh pairs of non-adjacent slots. Leg L2 of coil C2 is connected to the second inverter 106.

Figure 9:
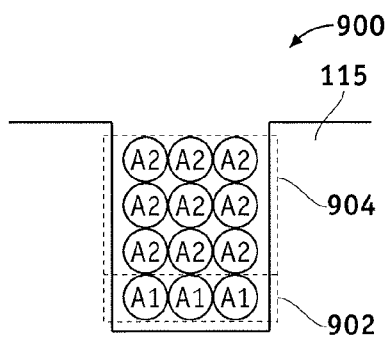
FIG. 9 is a cross section view of a slot, according to an embodiment.

Regardless of the embodiment, because the windings 114, 116, 118 are configured to have different current rating, the number of turns made by each coil A1, A2, B1, B2, C1, C2 may vary. Specifically, the stator assembly 111 is configured such that the first coils A1, B1, C1 make a first number of turns in the slots 1-12, and the second coils A2, B2, C2 make a second number of turns in the slots 1-12 that is unequal to the first number of turns. In an embodiment illustrated in FIG. 9, a cross-section view of a slot 900 is provided. The slot 900 includes a first layer 902 made up of coil A1 and a second layer 904 made up of A2. As can be seen, coil A1 is wound such that it has three turns in the slot 900. Coil A2 is wound such that it has nine turns in the slot 900. It will be appreciated that although coil A2 is depicted as being disposed over coil A1, this may not always be the case. Moreover, coil B1 may be disposed over or under coil B2, and coil C1 may be disposed over or under coil C2. Additionally, the number of turns may be different than shown.

An electric motor system topology has now been provided that may be capable of obtaining additional power output from a single motor system without adding complexity to the system. Additionally, the system topology may be implemented in a vehicle and may not increase the motor size. The topology may also provide capabilities similar to those of a conventional traction drive system having a three phase power converter fed from a single dc voltage source and a three phase traction motor, without the inclusion of the converter.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing the exemplary embodiment or exemplary embodiments. It should be understood that various changes can be made in the function and arrangement of elements without departing from the scope of the inventive subject matter as set forth in the appended claims and the legal equivalents thereof.

What is claimed is:

1. An electric motor system for use in a vehicle, comprising:
   a first inverter;
   a second inverter;
   a motor electrically coupled to the first and the second inverters, the motor comprising:
      a stator including a plurality of slots formed therein; and
      a plurality of windings disposed at least partially in the slots and including a first winding comprising a first coil and a second coil, at least a portion of the first winding first coil disposed in a first pair of non-adjacent slots and a second pair of non-adjacent slots, where a first slot of the second pair of non-adjacent slots is located adjacent a first slot of the first pair of non-adjacent slots and a second slot of the second pair of non-adjacent slots is adjacent a second slot of the first pair of non-adjacent slots, at least a portion of the first winding second coil disposed in the first and the second pairs of non-adjacent slots over the first winding first coil, the first coil having a first number of turns, the second coil having a second number of turns that is unequal to the first number of turns, the first coil of each winding electrically coupled to the first inverter, and the second coil of each winding electrically coupled to the second inverter.

2. The electric motor system of claim 1, wherein:
   the plurality of windings further includes a second winding comprising a first coil and a second coil;
   at least a portion of the second winding first coil is disposed in a third pair of non-adjacent slots and a fourth pair of non-adjacent slots, the third pair of non-adjacent slots located such that the second pair of non-adjacent slots is located between the first and third pairs of non-adjacent slots, and the fourth pair of non-adjacent slots located such that the third pair of non-adjacent slots is located between the second and fourth pairs of non-adjacent slots; and
   at least a portion of the second winding second coil is disposed in the third and fourth pairs of non-adjacent slots over the second winding first coil.

3. The electric motor system of claim 2, wherein:
   the plurality of windings further includes a third winding having a first coil and a second coil;
   at least a portion of the third winding first coil is disposed in a fifth pair of non-adjacent slots and a sixth pair of non-adjacent slots, the fifth pair of non-adjacent slots located such that the fourth pair of non-adjacent slots is located between the third and fifth pairs of non-adjacent slots, and the sixth pair of non-adjacent slots located such that the fifth pair of non-adjacent slots is located between the fourth and sixth pairs of non-adjacent slots; and
   at least a portion of the third winding second coil is disposed in the fifth and sixth pairs of non-adjacent slots over the third winding first coil.

4. The electric motor system of claim 1, wherein the first and the second inverters have a common ground.

5. The electric motor system of claim 1, further comprising:
 a first voltage source electrically coupled to the first inverter; and
 a second voltage source electrically coupled to the second inverter.

6. The electric motor system of claim 1, wherein:
 the first voltage source comprises a fuel cell; and
 the second voltage source comprises a battery.

7. An electric motor system for use in a vehicle, comprising:
 a first inverter;
 a second inverter;
 a motor electrically coupled to the first and the second inverters, the motor comprising:
  a stator including a plurality of slots formed therein; and
  a plurality of windings disposed at least partially in the slots, the plurality of windings including a first winding comprising a first coil and a second coil, at least a portion of the first winding first coil disposed in a first pair of non-adjacent slots and a second pair of non-adjacent slots, where a first slot of the second pair of non-adjacent slots is located adjacent a first slot of the first pair of non-adjacent slots and a second slot of the second pair of non-adjacent slots is adjacent a second slot of the first pair of non-adjacent slots, and at least a portion of the first winding second coil disposed in the first and the second pairs of non-adjacent slots over the first winding first coil, the first coil having a first number of turns and electrically coupled to the first inverter, and the second coil having a second number of turns that is unequal to the first number of turns and electrically coupled to the second inverter.

8. The electric motor system of claim 7, wherein:
 the plurality of windings further includes a second winding comprising a first coil and a second coil;
 at least a portion of the second winding first coil is disposed in a third pair of non-adjacent slots and a fourth pair of non-adjacent slots, the third pair of non-adjacent slots located such that the second pair of non-adjacent slots is located between the first and the third pairs of non-adjacent slots, and the fourth pair of non-adjacent slots located such that the third pair of non-adjacent slots is located between the second and fourth pairs of non-adjacent slots; and
 at least a portion of the second winding second coil is disposed in the third and fourth pairs of non-adjacent slots over the second winding first coil.

9. The electric motor system of claim 8, wherein:
 the plurality of windings further includes a third winding having a first coil and a second coil;
 at least a portion of the third winding first coil is disposed in a fifth pair of non-adjacent slots and a sixth pair of non-adjacent slots, the fifth pair of non-adjacent slots located adjacent such that the fourth pair of non-adjacent slots is located between the third and the fifth pairs of non-adjacent slots, and the sixth pair of non-adjacent slots located such that the fifth pair of non-adjacent slots is located between the fourth and sixth pairs of non-adjacent slots; and
 at least a portion of the third winding second coil is disposed in the fifth and sixth pairs of non-adjacent slots over the third winding first coil.

10. The electric motor system of claim 7, wherein the first and the second inverters have a common ground.

11. An electric motor system for use in a vehicle, comprising:
 a first inverter;
 a second inverter;
 a motor electrically coupled to the first and the second inverters, the motor comprising:
  a stator including a plurality of slots formed therein; and
  a plurality of windings disposed at least partially in the slots, the plurality of windings includes a first winding comprising a first coil and a second coil, at least a portion of the first winding first coil disposed in a first pair of non-adjacent slots and a second pair of non-adjacent slots, where a first slot of the second pair of non-adjacent slots is located adjacent a first slot of the first pair of non-adjacent slots and a second slot of the second pair of non-adjacent slots is adjacent a second slot of the first pair of non-adjacent slots, at least a portion of the first winding second coil disposed in the second pair of non-adjacent slots and a third pair of non-adjacent slots, the third pair of non-adjacent slots located such that the second pair of non-adjacent is disposed between the first and third non-adjacent pairs of slot, the first coil having a first number of turns and electrically coupled to the first inverter, and the second coil having a second number of turns that is unequal to the first number of turns and electrically coupled to the second inverter.

12. The electric motor system of claim 11, wherein:
 the plurality of windings further includes a second winding having a first coil and a second coil;
 at least a portion of the second winding first coil is disposed in the third pair of non-adjacent slots and a fourth pair of non-adjacent slots located such that the third pair of non-adjacent slots is located between the second and fourth pairs of non-adjacent slots; and
 at least a portion of the second winding second coil is disposed in the fourth pair of non-adjacent slots and a fifth pair of non-adjacent slots located such that the fourth pair of non-adjacent slots is between the third and fifth pairs of non-adjacent slots.

13. The electric motor system of claim 12, wherein:
 the plurality of windings further includes a third winding having a first coil and a second coil;
 at least a portion of the third winding first coil is disposed in the fifth pair of non-adjacent slots and a sixth pair of non-adjacent slots located such that the fifth pair of non-adjacent slots is located between the fourth and sixth pairs of non-adjacent slots; and
 at least a portion of the second winding second coil is disposed in the sixth pair of non-adjacent slots and a seventh pair of non-adjacent slots located such that the sixth pair of non-adjacent slots is between the fifth and seventh pairs of non-adjacent slots.

14. The electric motor system of claim 11, wherein the first and the second inverters have a common ground.

* * * * *